(12) United States Patent
Evers-Senne et al.

(10) Patent No.: US 9,767,855 B2
(45) Date of Patent: Sep. 19, 2017

(54) METHOD FOR CREATING A 3D MODEL OF AN OBJECT AND CORRESPONDING MODEL CALCULATION DEVICE AND MODEL CALCULATION DEVICE

(71) Applicant: Testo AG, Lenzkirch (DE)

(72) Inventors: Jan-Friso Evers-Senne, Titisee-Neustadt (DE); Martin Stratmann, Freiburg (DE); Hellen Altendorf, Kirchzarten (DE)

(73) Assignee: Testo AG, Lenzkirch (DE)

( * ) Notice: Subject to any disclaimer, the term of this patent is extended or adjusted under 35 U.S.C. 154(b) by 0 days.

(21) Appl. No.: 15/116,961

(22) PCT Filed: Feb. 6, 2014

(86) PCT No.: PCT/EP2014/000322
§ 371 (c)(1),
(2) Date: Aug. 5, 2016

(87) PCT Pub. No.: WO2015/117622
PCT Pub. Date: Aug. 13, 2015

(65) Prior Publication Data
US 2017/0148491 A1    May 25, 2017

(51) Int. Cl.
*H04N 5/775* (2006.01)
*H04N 5/89* (2006.01)
*G11B 27/36* (2006.01)
*G06T 17/00* (2006.01)
*G11B 20/00* (2006.01)
(Continued)

(52) U.S. Cl.
CPC .............. *G11B 27/36* (2013.01); *G06T 7/564* (2017.01); *G06T 17/00* (2013.01); *G11B 20/00007* (2013.01); *H04N 5/77* (2013.01); *G06T 2200/08* (2013.01); *G06T 2207/10016* (2013.01); *G11B 2020/00072* (2013.01)

(58) Field of Classification Search
CPC .............. G11B 27/36; G11B 20/00007; G11B 2020/00072; G06T 17/00; G06T 7/564; G06T 2200/08; G06T 2207/10016; H04N 5/77
USPC ....... 386/230, 232, 248, 224, 223, 323, 326, 386/334, 328
See application file for complete search history.

(56) References Cited

U.S. PATENT DOCUMENTS 9,240,070 B2 * 1/2016 Anderson-Sprecher ............................ G06T 15/005
2010/0007665 A1 * 1/2010 Smith ..................... G06T 13/40 345/473

OTHER PUBLICATIONS

Lee et al., "Mobile phone-based 3D modeling framework for instant interaction", 2009 IEEE 12th International Conference on Computer Vision Workshops, ICCV Workshops, Kyoto, Japan, Sep. 27-Oct. 4, 2009, Institute of Electrical and Electronics Engineers, Piscataway, NJ, Sep. 27, 2009, pp. 1755-1762.
(Continued)

*Primary Examiner* — Robert Chevalier
(74) *Attorney, Agent, or Firm* — Volpe and Koenig, P.C.

(57) ABSTRACT

In a model calculating apparatus (1) according to the invention it is provided, for the purpose of creating a detailed 3D model (20), by a recording device (3), to generate a first video data stream (4) and to generate a reduced video data stream (13) from frames (26) of the first video data stream (4) and to process further these reduced video data stream for the purpose of creating an approximated 3D model (30).

18 Claims, 2 Drawing Sheets

(51) Int. Cl.
H04N 5/77 (2006.01)
G06T 7/564 (2017.01)

(56) References Cited

OTHER PUBLICATIONS

Nguyen, M.H., et al., "Modelling of 3D Objects Using Unconstrained and Uncalibrated Images Taken with a Handheld Camera", Communications in Computer and Information Science—Computer Vision, Imaging and Computer Graphics Theory and Applications: International Joint Conference, Visigrapp 2011 Vilamoura, Portugal, Mar. 5-7, 2011 Revised Selected Papers 2013 Springer VE, vol. 274, 2013, pp. 86-101.

Brodsky T., et al., "Shape from Video", Proceedings of the 1999 IEEE Computer Society Conference on Computer Vision and Patter Recognition, Jun. 23-25, 1999; Fort Collins, Colorado, IEEE, The Institute of Electrical and Electronics Engineers, Inc., US, vol. 2, Jun. 23, 1999, pp. 146-151.

Bischoff, S. et al., "Towards robust broadcasting of geometry data", Computers and Graphics, Elsevier, GB, vol. 26, No. 5, Oct. 1, 2002, pp. 665-675.

\* cited by examiner

METHOD FOR CREATING A 3D MODEL OF AN OBJECT AND CORRESPONDING MODEL CALCULATION DEVICE AND MODEL CALCULATION DEVICE

BACKGROUND

The invention relates to a method for creating a detailed 3D model of an object, wherein, by the use of a recording device, a first video data stream comprising frames is recorded from the object and is transmitted to an external computing unit, and wherein the detailed 3D model is created from the frames of the first video data stream in the external computing unit.

The invention furthermore relates to a model calculating device, comprising a recording device designed for recording a first video data stream comprising frames from an object, comprising a data interface designed for producing a data connection to an external computing unit and for transmitting the first video data stream via the data connection, and comprising a local computing unit.

Finally, the invention relates to a model calculating apparatus.

It is known to create 3D models from video data streams of frames. For this purpose, by way of example, prominent pixels can be identified in the recorded frames and corresponding pixels in different frames can be related to one another. For the pixels related to one another, it is then possible to establish a system of equations describing the pixels related to one another as projections or recordings of an object from different recording poses. This system of equations can be solved in a computer-implemented manner, such that three-dimensional position indications with respect to the identified pixels and indications with respect to the recording poses from which the individual frames of the video data stream were recorded are available as a result.

The known methods have the disadvantage that they are computationally intensive. Difficulties therefore arise in implementing the required routines in handheld devices in order to enable a direct visual monitoring of the result during recording.

SUMMARY

The invention is based on the object of providing technical support in creating 3D models.

In order to achieve said object, one or more features according to the invention are provided. In particular, therefore, in order to achieve the aforementioned object in a method of the type described in the introduction it is provided according to the invention that a reduced video data stream is generated from the frames of the first video data stream in a local computing unit connected to the recording device, and that an approximated 3D model of the object is created from the reduced video data stream. The invention affords the advantage that a complexity of a mathematical problem for creating a 3D model can be drastically reduced with the reduced video data stream. Consequently, the approximated 3D model according to the invention can be handled even with the typically limited computational capacity of a portable computing unit. The invention thus enables a user to acquire first information about the 3D model to be expected in the form of an approximated 3D model without recourse to an external computing unit. This enables the user to monitor on site in the vicinity of the object whether the first video data stream is sufficient for generating the detailed 3D model, or whether a new or additional video data stream must be recorded. The computing power of a stationary computing unit is not required for this purpose. The method can be implemented even with the limited resources of a handheld measuring device.

In one configuration of the invention it may be provided that the approximated 3D model is created and/or updated during the continued recording of the first video data stream. It is advantageous here that a visual monitoring of the work result to be expected in the form of the detailed 3D model can already be carried out during the recording process. This is because, on the basis of the approximated 3D model, the user can easily recognize whether, for example, details of the object are still captured inadequately.

In one configuration of the invention it may be provided that the approximated 3D model is displayed. It is particularly expedient if the approximated 3D model is displayed at the local computing unit. It is advantageous here that the user is given a first impression of how the detailed 3D model from the object will be expected to appear on the basis of the recorded first video data stream. It is particularly expedient here if the approximated 3D model is displayed during the continued recording of the first video data stream. A visual monitoring of the recording process can thus be performed in real time. Improvements of the first video data stream by additional recordings, for example, can be performed immediately on site.

In one configuration of the invention it may be provided that the reduced video data stream is generated by a reduction of an image resolution of the frames of the first video data stream. It is advantageous here that a complexity of the image processing of the frames can be reduced. A computational complexity can be considerably reduced as a result.

Alternatively or additionally it may be provided that the reduced video data stream is generated by a selection of a subset of the frames of the first video data stream. It is advantageous here that an alternative possibility for reducing the volume of data can be implemented.

It is particularly expedient if both possibilities for reduction are combined with one another.

A third possibility for reducing the video data stream is provided in the reduced video data stream being generated by an extraction of prominent structures from the frames of the first video data stream. It is advantageous here that unimportant data contents can be suppressed in the reduced video data stream. These unimportant data contents would otherwise burden the local computing unit unnecessarily during the calculation of the approximated 3D model. By way of example, said prominent structures may be given by planes and/or edges in the frames, which can be found automatically by image processing methods. It is advantageous here that an automated reduction of the video data stream can be implemented. It is particularly expedient here, too, if this variant of the reduction of the video data stream is combined with one or both of the already described reductions of the video data stream.

In contrast to lossless data compression, the reduction of the video data stream according to the invention brings about a genuine decrease in the data content. In the case of a compression, by contrast, the data content generally remains the same, while merely the representation of the data content is optimized in order to enable overall a smaller memory space to suffice.

The complexity of the mathematical systems of equations to be solved can be reduced by the reduction of the video data stream according to the invention.

In one configuration of the invention it may be provided that the reduced video data stream is assembled from reduced and/or selected frames, wherein the reduced and/or selected frames are checked for usability for creating the approximated 3D model and are removed from the reduced video data stream in the case of lack of usability. It is advantageous in this case that the volume of data in the reduced video data stream can be reduced again. As a result the creation of the approximated 3D model can be accelerated again. The check for usability may comprise, for example, the identification of outliers or the elimination of frames which cannot be brought to correspondence with other frames in terms of contents.

In one configuration of the invention it may be provided that a plausibility and/or completeness check is carried out for the approximated 3D model. It is advantageous here that it is possible to indicate to the user in an automated manner if the detailed video data stream suffices for generating a complete detailed 3D model. It is furthermore advantageous that it is possible to indicate to the user regions of the object for which the recording of the video data stream must be repeated. Consequently, a first monitoring of the quality of the recorded video data stream can already be carried out on site at the object. This has the advantage that erroneous video data streams can be corrected in a simple manner by supplementing and/or repeating the recording.

In one configuration of the invention it may be provided that at least one point sequence and/or at least one edge and/or surface model are/is calculated for creating the approximated 3D model from the reduced video data stream. With the point sequence, an approximated 3D model can thus be provided in a simple manner. The use of edge and/or computation models has the advantage that the optical impression of the created approximated 3D model can be improved, such that a user can identify interrelated structural elements in a simple manner.

In one configuration of the invention it may be provided that at least one envelope curve and/or at least one envelope surface are/is calculated from the reduced data stream. It is advantageous here that outer boundaries and contours of the 3D model can be calculated, identified or displayed in a simple manner. It is particularly expedient if the envelope curve and/or the envelope surface are/is calculated for creating the approximated 3D model. It is advantageous here that an exterior view of the 3D model can be generated in a simple manner with the at least one envelope curve and/or at least one envelope surface.

Through the use of envelope curves and/or envelope surfaces, artifacts that may arise in approximated 3D models due to the data reduction in the video data stream can be compensated for or suppressed in a simple manner.

In one configuration of the invention it may be provided that a recording pose, movement and/or change of pose of the recording device during the recording of the first video data stream are/is calculated from the reduced video data stream. It is advantageous here that additional information is available which facilitates or supports the mathematical solution of the abovementioned complex system of equations for the calculation of the detailed 3D model. The computational complexity for calculating the detailed 3D model can thus likewise be reduced since computation results arising from solving the system of equations for the full data content in the manner already described can at least approximately already be provided beforehand as input variables. This makes it possible, precisely in optimization methods, to considerably reduce the computational complexity for creating the detailed 3D model.

It may be provided here that the calculated recording pose, movement or change of pose of the recording device is transmitted with the first video data stream to the external computing unit. It is advantageous here that the recording pose, movement or change of pose of the recording device can be provided as an additional input for the calculation of the detailed 3D model. It is particularly expedient if the transmission is effected with the first video data stream. A further use of the calculated recording pose, movement or change of pose can thus be performed in real time during the processing of the full video data stream.

In one configuration of the invention it may be provided that at least one object-independent secondary condition that reduces a complexity of the object is used for creating the approximated 3D model. It is advantageous here that data contents which are unimportant for the creation of an approximated 3D model can be removed in an automated or computer-implemented manner. By way of example, such an object-independent secondary condition may state that the object has a specific geometrical shape, that the object is composed of surfaces having a specific shape and/or size (and may therefore have no "holes" below the size of these surfaces) or that other geometrical and/or algebraic properties of the object can be used for reducing the volume of data.

In one configuration of the invention it may be provided that the detailed 3D model is created in an optimization routine for an energy functional. It is advantageous here that an accurate calculation of the 3D model from the full data content of the first video data stream is made possible.

In one configuration of the invention it may be provided that the detailed 3D model created by the external computing unit is transmitted to the local computing unit. It is advantageous here that it is possible to carry out a display and/or further processing of the full, detailed 3D model at the local computing unit after the computationally intensive calculation steps for creating the detailed 3D model have been concluded.

A computing and/or storage unit can serve as external computing unit, for example an external PC, a storage and/or computing area in the Internet (so-called "cloud"), and so on.

In order to achieve the aforementioned object, in the case of a model calculating device, the features of the independent claim directed to a model calculating device are provided. In particular, therefore, according to the invention, in order to achieve the aforementioned object, in the case of a model calculating device of the type described in the introduction, according to the invention it is provided that the local computing unit is designed for generating a reduced video data stream from the frames of the first video data stream and for creating an approximated 3D model of the object from the reduced video data stream. It is advantageous here that a model calculating device is provided with which the method according to the invention can be performed. Preferably, the model calculating device is embodied as a handheld device which is connectable to a preferably stationary external computing unit via the data interface.

In one configuration of the invention it may be provided that the local computing unit is designed for calculating a recording pose, movement and/or change of pose of the recording device during the recording of the first video data stream from the reduced video data stream. It is advantageous here that additional information is obtainable in the local computing unit, which is usable for reducing a complexity of the mathematical problem for creating the detailed 3D model.

It may be provided here that the local computing unit is designed for a combination of the calculated recording pose, movement and/or change of pose of the recording device with the first video data stream. It is advantageous here that the detailed, originally recorded first video data stream can be enriched with additional information permitting a reduction of the complexity of the mathematical problem to be calculated. It is particularly expedient if the combination is effected in a correctly timed manner. In this case, a correctly timed combination may be characterized by the fact that the calculated recording pose, movement and/or change of pose of the recording device are/is assigned to that frame or to those frames which was/were recorded with respect to the recording pose or during the movement or change of pose.

In one configuration of the invention it may be provided that a display unit is designed for displaying the created approximated 3D model and/or for displaying the calculated detailed 3D model. Displaying the approximated 3D model has the advantage that a direct visual monitoring can be performed during the recording process. Displaying the detailed 3D model has the advantage that a work result can be viewed directly after the calculation, for example when the user is still on site at the object. A user can thus rapidly decide whether further recordings from the object are necessary for creating an improved detailed 3D model, or whether the work result is sufficient for said user's purposes.

In one configuration of the invention it may be provided that the local computing unit is designed for reducing an image resolution. It is advantageous here that a simple variant of providing a reduced video data stream can be realized. Alternatively or additionally it may be provided that the local computing unit is designed for reducing an image content. Reducing the image content can be effected in reduction editing and/or by a reduction means, for example by identifying and extracting prominent structures such as planes and/or edges or the like. It is advantageous here that unimportant image contents can be removed before creating the approximated 3D model, such that the total computational complexity for creating the approximated 3D model can be significantly reduced.

In accordance with a third variant, which can be combined with the abovementioned variants, it may be provided that the local computing unit is designed for selecting a subset of the frames of the first video data stream. It is advantageous here that the volume of data can be reduced in a simple manner. By way of example, it may be provided that each frame provided for acceptance in the reduced video data stream can be removed from the reduced video data stream if said frame would contribute nothing or would make only an insignificant contribution to the approximated 3D model. In this way, the required computational capacity can be reduced again since the complexity for creating the approximated 3D model can be reduced again.

In one configuration of the invention it may be provided that the local computing unit is designed for creating at least one point cloud from the reduced video data stream. It is advantageous here that a three-dimensional representation of the recorded object can be generated. Creating point clouds is known per se and can be applied advantageously here.

Here or in a further configuration of the invention it may be provided that the local computing unit is designed for calculating at least one envelope curve and/or at least one envelope surface from the reduced video data stream. It is particularly expedient if the calculation of the envelope curve and/or envelope surface is derived from the previously calculated approximated 3D model. The use of envelope curves and/or envelope surfaces affords the advantage that computational errors resulting from the reduced resolution or volume of data can be compensated for.

Synergistic effects can be achieved if, in the model calculating device according to the invention, means are embodied and designed for performing a method according to the invention, in particular as described above and/or according to one of the claims directed to a method. The design may be effected here by means of suitable programming, for example.

The object mentioned in the introduction is achieved according to the invention in the case of a model calculating apparatus of the type described in the introduction by virtue of the fact that a model calculating device according to the invention is implemented and by virtue of the fact that an external computing unit connectable to the model calculating device for the purpose of data transmission is implemented, wherein the external computing unit is designed for creating a detailed 3D model from the first video data stream transmitted via the data connection. It is advantageous here that it is possible to set up a division of work between a fast, inaccurate creation of an approximated 3D model, on the one hand, and an accurate, but complex method for creating a detailed 3D model. What can thus be achieved according to the invention is that an approximate representation of the 3D model can be calculated beforehand and can be used for controlling the recording of the video data stream for creating the detailed 3D model.

BRIEF DESCRIPTION OF THE DRAWINGS

The invention will now be described in greater detail on the basis of an exemplary embodiment, but is not restricted to said exemplary embodiment. Further exemplary embodiments arise through combination of the features of individual or a plurality of claims among one another and/or with individual or a plurality of features of the exemplary embodiment.

In greatly simplified block diagram representation.

DETAILED DESCRIPTION OF THE PREFERRED EMBODIMENTS

Figure 1:
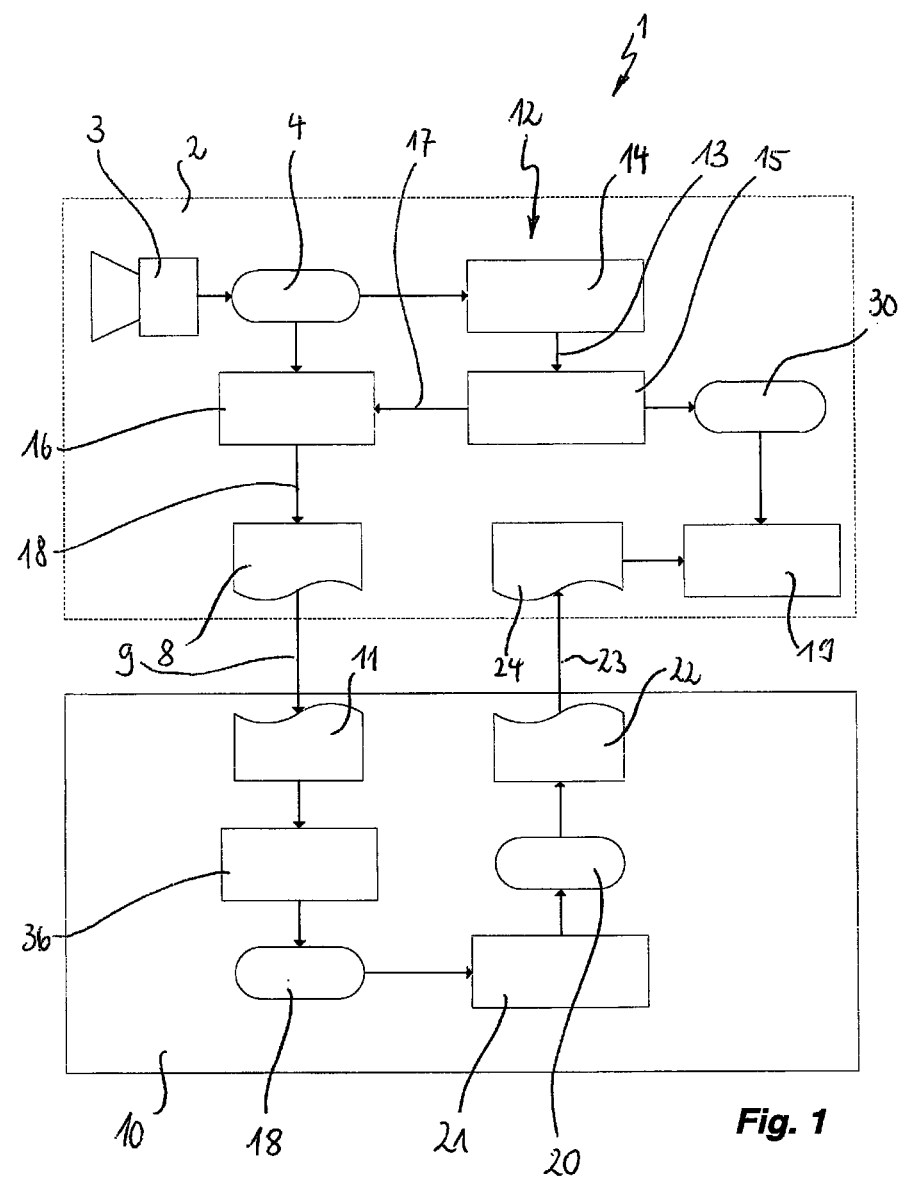
FIG. 1: shows a model calculating apparatus according to the invention comprising a model calculating device according to the invention for performing a method according to the invention.

FIG. 1 shows, in a greatly simplified basic schematic as a block diagram, a model calculating apparatus according to the invention, said apparatus being designated in its entirety by 1.

The model calculating apparatus 1 has a model calculating device 2 equipped with a recording device 3.

The recording device 3 is designed for recording a first video data stream 4 comprising frames from an object (not illustrated any further here).

For this purpose, in an image recording step 5, the individual frames are recorded by the recording device 3. The recorded frames are subsequently compressed in an image compression step 6 and are added to the first video data stream 4 as long as a termination condition of a loop 7 is not met.

The model calculating apparatus 1 has a data interface 8, via which a data connection 9 to an external computing unit 10 can be established.

The external computing unit 10 is embodied separately from the model calculating device 2 and is set up at a remote location.

The data connection 9 is established between the data interface 8 and a corresponding data interface 11 of the external computing unit 10. A wired or a wireless data connection 9 may be involved here.

The model calculating device 2 has a local computing unit 12 embodied in a manner integrated in the model calculating device 2.

The local computing unit 12 is designed for generating a reduced video data stream 13 from the frames of the first video data stream 4.

For this purpose, the local computing unit 12 comprises a reduction device 14, by which an image resolution of the frames 26 can be reduced in a manner known per se. In addition, the reduction device 14 can also reduce the number of further-processed frames 26 of the first video data stream 4 by selecting a subset of said frames 26.

In this way the volume of data of the reduced video data stream 13 is considerably reduced compared with the volume of data of the first video data stream 4.

A model creating unit 15 is designed for creating an approximated 3D model 16 of the recorded object from the reduced video data stream 13.

For this purpose, a system of equations is generated from the frames of the reduced video data stream 13, and the solution thereof is described by the recording poses of the recording device 3 during the recordings of the frames 26.

The local computing unit 10 is thus designed for calculating a recording pose, a movement and a change of pose of the recording device 3 during the recording of the first video data stream 4, that is to say between or upon the recordings of the individual frames. The local computing unit 12 processes the reduced video data stream 13 for this purpose.

A combination unit 16 receives the calculated information 17 about a recording pose, a movement or change of pose of the recording device 3, for example in the form of individual recording poses and/or differences of recording poses, from the model creating unit 15 and adds the information to the first video data stream 3 in a correctly timed manner.

The first video data stream 4 is thus enriched by the information 17 to form an enriched video data stream 18 by virtue of the frames of the first video data stream 4 being combined with the respectively associated information 17 about a recording pose and/or a movement or change of pose with respect to the preceding frame.

The created approximated 3D model 16 can be displayed on a display unit 19.

For creating the approximated 3D model, the model creating unit 15 is designed such that at least one point cloud can be created from the reduced frames 28 of the reduced video data stream. This point cloud serves as a starting point 5 for the calculation of the approximated 3D model 30.

When creating the approximated 3D model 30, the already described reduction of the volume of data for creating the reduced video data stream 13 results in defects and discontinuities, and the like, which make it more difficult to carry out a comparison with the object to be recorded.

The model creating unit 15 is therefore designed to create an envelope curve and/or an envelope surface with respect to the point cloud. This envelope curve and/or envelope surface describe(s) the outer appearance of the object sufficiently accurately. The user can thus directly compare the approximated 3D model 30 with the recorded object.

Instead of a point cloud or in addition to a point cloud, the model creating unit 15 can create an edge and/or surface model from the reduced frames 28 of the reduced video data stream 13. For this purpose, the recorded object is approximated by elementary geometrical shapes.

The external computing unit 10 is designed for creating a detailed 3D model 20. For this purpose, the external computing unit 10 comprises an optimization unit 21, in which an optimization routine for an energy functional can be performed in order to calculate the detailed 3D model 20 in a manner known per se.

The calculated detailed 3D model 20 can be transmitted by a second data interface 22 via a second data connection 23 to a second corresponding data interface 24 of the model calculating device 2.

Figure 2:
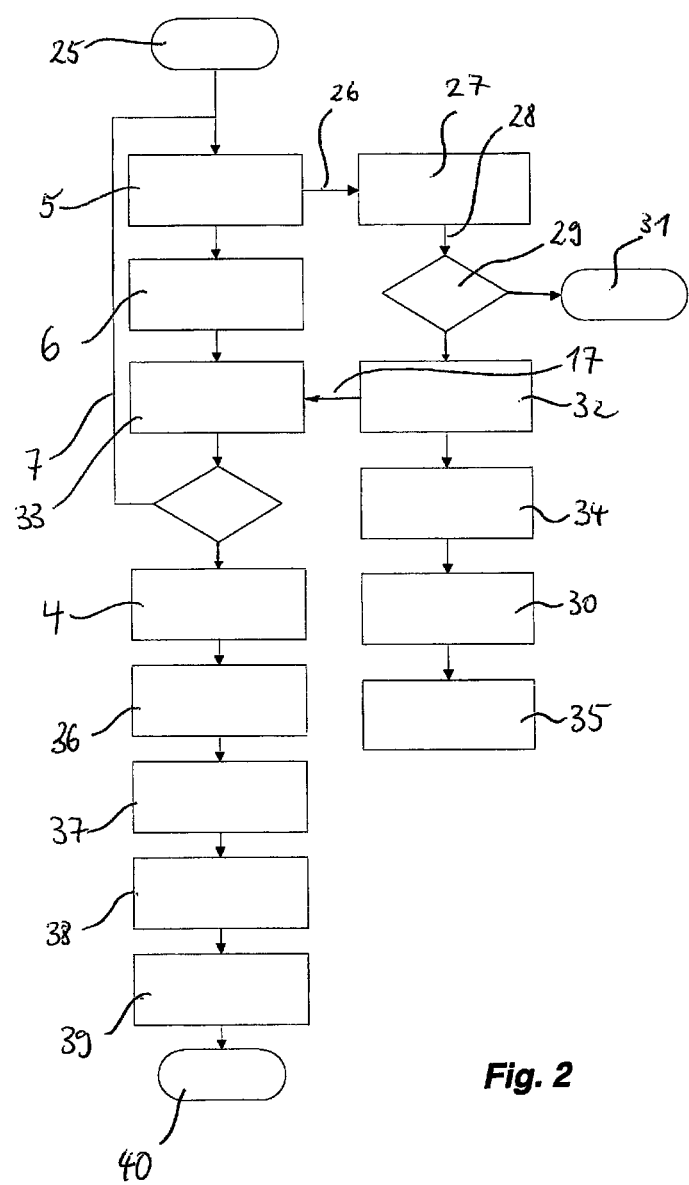
FIG. 2: shows method steps of a method according to the invention.

The method according to the invention proceeds in accordance with FIG. 2.

After the start 25, a first video data stream 4 is created in the model calculating device 2 by means of the recording device 3 in the manner already described.

During the continued recording of the first video data stream 4, a reduced frame 28 is in each case created from the copied frames 26 of the first video data stream 4 in a reduction step 27.

This is done by reducing the image resolution of the frames 26 and/or by selecting a subset of the frames 26 of the first video data stream 4. Alternatively or additionally, in the reduction step 27 it may be provided that prominent structures, for example planes and/or edges, are extracted from the frames 26.

In a checking step 29, the reduced frames 28 are checked for usability for creating the approximated 3D model 30.

The rejected frames 31 are removed from the reduced video data stream 13. In a recording pose calculating step 32, the recording poses of the recording device 3 during the recording of the respective frames 26 are calculated from the reduced frames 28 in a manner known per se.

The sequence of said recording poses represents information 17 about the movement or change of pose of the recording device 3 during the recording of the first video data stream 4. This information 17 is passed back to the first video data stream 4 and combined with the frames of the first video data stream 4 in a combination step 33, wherein a temporal assignment is complied with. The enriched video data stream 18 thus results.

In a model calculating step 34, the approximated 3D model 30 is calculated from the reduced video data stream 13 in the local computing unit 12.

This approximated 3D model 30 is subsequently displayed on the display unit 19 in a display step 35. The first video data stream 4 enriched with the information 17 about a recording pose, movement or change of pose of the recording device 3 is fed to the external computing unit 10 via the data connection 9.

In the external computing unit 10, the enriched video data stream 18 is firstly decompressed in a decompression step 36.

Afterward, in a manner known per se, in a model calculating step 37, a detailed 3D model 20 is calculated from the frames 26 of the video data stream 4 and the assigned information 17 in the enriched video data stream 18.

For this purpose, the decompressed enriched video data stream 18 is processed further in a manner known per se.

For this purpose, an optimization routine that optimizes an energy functional proceeds in the optimization unit 21. The information concerning the recording pose, movement or change of pose of the recording device 3 that is contained in the enriched video data stream 18 serves to select a computationally expedient starting point for the optimization routine.

In a transmission step 38, the calculated detailed 3D model 20 is transmitted back to the local model calculating device 2 via the second data connection 23.

In a display step 39, the detailed 3D model 20 is displayed on the display unit 19 of the model calculating device 2, whereupon the end 40 of the method is reached.

The display step 35 here proceeds during the creation of the first video data stream 4. The approximated 3D model 30 is thus constantly improved during the recording of the first video data stream 4.

During the recording of the first video data stream 4 a user can thus monitor in a simple manner whether the object has already been completely captured for creating the detailed 3D model 20 or whether further frames 26 must be recorded.

For this purpose, the model creating unit 15 is designed for carrying out a plausibility or completeness check. This check involves determining in an automated manner defects or inconsistencies in the reduced video data stream 30 and displaying them to the user on the display unit 19 or outputting them in some other way.

For reducing the computational complexity when calculating the approximated 3D model 30, object-independent secondary conditions are used in the model creating unit 15 in order to reduce the complexity of the recorded object. Such secondary conditions may describe, for example, that the object is approximately composed of elementary geometrical basic shapes, for example regular or irregular lines, surfaces and/or bodies.

In the model calculating apparatus 1 according to the invention it is provided, for creating a detailed 3D model 20, by a recording device 3, to generate a first video data stream 4 and to generate a reduced video data stream 13 from frames 26 of the first video data stream 4 and to process further said reduced video data stream for creating an approximated 3D model 30.

The invention claimed is:

1. A method for creating a detailed 3D model (20) of an object, comprising using a recording device (3), recording a first video data stream (4) comprising frames (26) from the object and transmitting the first video data stream to an external computing unit (10), and creating the detailed 3D model (30) from the frames (26) of the first video data stream (4) in the external computing unit (10), generating a reduced video data stream (13) from the frames (26) of the first video data stream (4) in a local computing unit (12) connected to the recording device (3), and creating an approximated 3D model (30) of the object from the reduced video data stream (13).

2. The method as claimed in claim 1, wherein the approximated 3D model (30) is at least one of created or updated during the continued recording of the first video data stream (4), and the approximated 3D model (30) is displayed during the continued recording of the first video data stream (4).

3. The method as claimed in claim 1, wherein the reduced video data stream (13) is generated by at least one of a reduction of an image resolution of the frames (26) of the first video data stream (4) or by selection of a subset of the frames (26) of the first video data stream (4).

4. The method as claimed in claim 1, further comprising assembling the reduced video data stream (13) from at least one of reduced or selected frames (28), checking the at least one of reduced or selected frames (28) for usability for creating the approximated 3D model (30) and removing the at least one of the reduced or selected frames from the reduced video data stream (13) in case of a lack of usability.

5. The method as claimed in claim 1, further comprising calculating at least one point cloud, at least one edge, a surface model, or a combination thereof for creating the approximated 3D model (30) from the reduced video data stream (13).

6. The method as claimed in claim 1, further comprising calculating at least one of a recording pose, movement or change of pose of the recording device (3) during the recording of the first video data stream (4) from the reduced video data stream (13), and transmitting the calculated recording pose, movement or change of pose of the recording device (3) with the first video data stream (4) to the external computing unit (10).

7. The method as claimed in claim 1, wherein at least one object-independent secondary condition that reduces a complexity of the object is used for creating the approximated 3D model (30).

8. The method as claimed in claim 1, further comprising creating the detailed 3D model (20) in an optimization routine for an energy functional, and transmitting the detailed 3D model (20) created by the external computing unit (10) to the local computing unit (12).

9. A model calculating device (2), comprising a recording device (3) designed for recording a first video data stream (4) comprising frames (26) from an object, a data interface (8) designed for producing a data connection (29) to an external computing unit (10) and for transmitting the first video data stream (4) via the data connection (29), and a local computing unit (12), the local computing unit (12) is designed for generating a reduced video data stream (13) from the frames (26) of the first video data stream (4) and for creating an approximated 3D model (30) of the object from the reduced video data stream (13).

10. The model calculating device (2) as claimed in claim 9, wherein the local computing unit (12) is designed for calculating at least one of a recording pose, movement or change of pose of the recording device (3) during the recording of the first video data stream (4) from the reduced video data stream (13).

11. The model calculating device (2) as claimed in claim 9, further comprising a display unit (19) designed for displaying the created approximated 3D model (30) or the calculated detailed 3D model (20), or both.

12. The model calculating device (2) as claimed in claim 9, wherein the local computing unit (12) is designed for reducing at least one of an image resolution or an image content by extracting prominent structures of the frames (26) of the first video data stream (4) or selecting a subset of the frames (26) of the first video data stream (4), or both.

13. The model calculating device (2) as claimed in claim 9, wherein the local computing unit (12) is designed for creating at least one point cloud, at least one edge, a surface model, or a combination thereof from the reduced video data stream (13), or the local computing unit (12) is designed for calculating at least one envelope curve or at least one envelope surface from the reduced video data stream (13).

14. A model calculating apparatus (1) comprising a model calculating device (2) as claimed in claim 9, an external computing unit (10) connectable to the model calculating device (2) for data transmission, and the external computing unit (10) is designed for creating a detailed 3D model (20) from the first video data stream (4) transmitted via the data connection (29).

15. The method as claimed in claim 1, wherein the reduced video data stream (13) is generated by an extraction of prominent structures from the frames (26) of the first video data stream (4).

16. The method as claimed in claim 1, further comprising carrying out at least one of a plausibility or completeness check for the approximated 3D model (30).

17. The method as claimed in claim 1, further comprising calculating at least one envelope curve, at least one envelope surface, or a combination thereof from the reduced video data stream (13) for creating the approximated 3D model (30).

18. The model calculating device as claimed in claim 9, wherein the local computing unit (12) is designed for a correctly timed combination of at least one of a calculated recording pose, movement, or change of pose of the recording device (3) with the first video data stream (4).

* * * * *